United States Patent [19]

Inoue

[11] Patent Number: 5,078,850
[45] Date of Patent: Jan. 7, 1992

[54] ELECTRODEPOSITION COATING SYSTEM

[75] Inventor: Akito Inoue, Tachikawa, Japan

[73] Assignee: Polytechs Inc., Tokyo, Japan

[21] Appl. No.: 499,817

[22] Filed: Mar. 27, 1990

[30] Foreign Application Priority Data

Apr. 10, 1989 [JP] Japan ................................ 1-90254
Jun. 7, 1989 [JP] Japan ................................ 1-144458
Jun. 7, 1989 [JP] Japan ................................ 1-144459

[51] Int. Cl.⁵ ..................... C25C 7/04; C25D 13/04; B01D 61/42
[52] U.S. Cl. .......................... 204/282; 204/299 EC; 204/301
[58] Field of Search ................. 204/299 EC, 301, 282

[56] References Cited

U.S. PATENT DOCUMENTS

| 3,419,488 | 12/1968 | Cooke | 204/180.8 |
| 3,620,955 | 11/1971 | Jones | 204/283 |
| 4,105,534 | 8/1978 | Beatty | 204/301 |
| 4,469,564 | 9/1984 | Okinaka et al. | 204/15 |
| 4,711,709 | 12/1987 | Inoue | 204/282 |
| 4,834,861 | 5/1989 | Inoue | 204/299 EC |
| 4,851,102 | 7/1989 | Inoue | 204/299 EC |
| 4,883,573 | 11/1989 | Voss et al. | 204/299 EC |

FOREIGN PATENT DOCUMENTS 0093174 11/1983 European Pat. Off. .
0302978 2/1989 European Pat. Off. .

Primary Examiner—John F. Niebling
Assistant Examiner—Kishor Mayekar
Attorney, Agent, or Firm—Sandler, Greenblum & Bernstein

[57] ABSTRACT

An electrodeposition coating system widely used for automatic coating process, etc. of motor vehicles. This system includes an article to be coated, which is a first electrode, and provided in an electrodeposition bath and a second electrode or electrodes constituted by one or more electrodes and provided in association with the article. In this system, current is passed between the both electrodes through an aqueous solution of a substance for forming a coating a film, which is contained in the electrodeposition bath, to thereby electrodeposit the substance for forming a coating material onto the article. The aqueous solution and the second electrodes or electrodes are separated from each other by a membrane portion having a first function of precluding the flow of ionized neutralizing agent in the aqueous solution attracted by the second electrode or electrodes and a second function of precluding the flow of ions flowing out of the side of the second electrode or electrodes attracted by the first electrode.

12 Claims, 10 Drawing Sheets

ELECTRODEPOSITION COATING SYSTEM

BACKGROUND OF THE INVENTION

1. Field of the Invention

This invention relates to an electrodeposition coating system, and more particularly to an electrodeposition coating system comprising a first electrode immersed in an aqueous solution of a substance for forming a coating film and a second electrode provided in association with the first electrode, the second electrode being provided with a membrane portion for separating the second electrode from the first electrodes and the aqueous solution.

2. Description of the Prior Art

The electrodeposition coating is broadly divided into two including one using a coating material of anion type and the other using a coating material of cation type. Since, in either of these electrodeposition coatings, uniformity and adhesion of the coating on an article to be coated are excellent and the degree of causing pollution is low, these electrodeposition coatings have recently been widely applied to the automatic coating film treatment of motor vehicle bodies and so forth for example, particularly as suitable ones in the prime coating or one coat finishing for the coating of metal materials.

Out of the coating materials used in these electrodeposition coatings, as the coating material of anion type, one, in which carboxyle group is adhered to resin having a molecular weight (MW) of 2000 so as to be water-soluble, is used, while, as the aforesaid coating material of cation type, one, in which amino group is attached to a resin component of the coating material so as to be water-soluble, is used. On the other hand, even with these water-soluble coating materials, the degrees of ionization after being dissolved in the water are very low. For this, at present, in the case of the coating material of anion type, an alkaline neutralizing agent such for example as triethylamine is mixed thereinto, while, in the case of the coating material of cation type, an acidic neutralizing agent such as acetic acid is mixed thereinto, whereby, in the both cases, neutralizing is effected, respectively, to thereby increase the degrees of ionization in the water.

The neutralizing agents are mixed for increasing the degrees of ionization in accordance with the properties of the resin components of the respective coating materials as described above. On the other hand, when the electrodeposition treatment of the articles to be coated advances to decrease the resin component in the solution, the coating material should be successively supplied from the outside. Accordingly, in the solution, there is accumulated amine or acetic acid as the neutralizing agent, whereby a phenomenon such as redissolving of the coated surface or occurrence of pin holes is generated, so that the efficiency of the electrodeposition coating is impaired to a considerable extent.

For this, recently, as described in Japanese Patent Kokoku (Post-Exam. Publn.) No. 22231/1970 for example, such a so-called pH control is performed for increasing the efficiency that, one electrode is separated from the article as being the other electrode and an aqueous solution by use of an ion-exchange membrane or the like, and amine or acetic acid is osmotically extracted by use of the ion-exchange membrane or the like, to thereby prevent the neutralizing agent from increasing in the aqueous solution.

The electrodeposition of cation type using a coating material of cation type will hereunder be described.

In the electrodeposition of cation type, there has been used an anion exchange membrane as a membrane. This anion exchange membrane normally has a value of $8-10 \times 10^{-6}$ (mol/Coulomb) as an electric efficiency of removing the acid (Coulomb acid removing rate).

The acid (neutralizing agent) added to the aqueous solution (ED bath coating material) in the electrodeposition bath amounts to a value A contained in the coating material supplied to the electrodeposition bath.

On the other hand, the acid taken out from the ED bath coating material to the outside totally amounts to a value B, which includes:

(1) 10%-20% of the value A taken out as the acid contained in a UF filtrate used as a rinsing liquid after the electrodeposition coating.

(2) 5%-10% of the value A taken out as the acid contained coating film.

(3) 70%-80% of the value A, which is removed by the membrane electrodes.

Although it is ideal that the value A is equal to the value B, it is difficult to adjust to obtain such an equality. In general, $B > A$ is adopted, whereby if needed, a small amount of acid is added to the bath to keep exact acid balance.

For this reason, when all of the electrodes provided in the electrodeposition bath are turned to be the membrane electrodes, removal of the acid becomes highly excessive, whereby such disadvantages are presented that the acid as being the neutralizing agent lacks and the acid needs to be periodically supplied from the outside and so forth, so that the control of the neutralizing agent in the ED bath coating material becomes troublesome and the acid is uselessly consumed. For this, nowadays, some of the electrodes are constituted by so-called bare electrodes having no membranes, so that removal of the acid can be well balanced.

As described above, when the rate of removal is $8-10 \times 10^{-6}$ (mol/Coulomb), removal of the acid becomes excessive and when the rate of removal is $5-6 \times 10^{-6}$ (mol/Coulomb), removal of the acid becomes ideally balanced, so that a neutral membrane having the latter rate of acid removal may be used sometimes.

In addition, in the electrodeposition of cation type, some of the membrane electrodes may use cation exchange films.

However, the technique of using the bare electrodes as some of the electrodes in the above-described example of the prior art presents the following serious disadvantages in view of meeting the requirement for high quality finishing of coating in recent years.

Namely, a sludge mainly containing an inorganic pigment educed on the surfaces of the bare electrodes is problematical and useful components in the coating material tend to contain a component facilitating the electrolytic corrosion of the electrodes (in general, there are many cases where SUS 316 are used), thereby causing a drastic electrolytic corrosion during current passage. Normally, the rate of electrolytic corrosion of SUS 316 is about $2-3 \times 10^{-6}$ (g/Coulomb) to the passing current, however, in the above case, the rate of electrolytic corrosion may reach even $100-150 \times 10^{-6}$ (g/Coulomb).

As described above, there have been presented such disadvantages that heavy metal ions (Fe, Cr, Ni, etc.) and the like, which are melted out of the electrodes due to the electrolytic corrosion, are mixed into the coating material, whereby surface roughening of a coated surface, lowered rust prevention, coloring by the heavy metals and so forth are caused.

Furthermore, even in the case of use of the neutralizing film in the above-described example of the prior art, the disadvantages same as above have been presented because the neutralizing film allows the components, the heavy metal ions and the like, which facilitate the electrolytic corrosion, to pass therethrough.

Further, in the case of use of the cation exchange film in the above-described example of the prior art, the Coulomb acid removing rate is as low as $1 \times 10^{-6}$ (g/Coulomb) or therebelow, and the cation exchange films are used in some of the all membrane films, so that the acid can be prevented from being excessively removed. However, a passing rate of electrolytic corrosion reaches even $4-15 \times 10^{-6}$ (g/Coulomb) due to the passage of the heavy metal ions melted out of the electrodes. In other words, this means the disadvantage that, when the cation exchange films are used, almost all of the heavy metal ions melted out of the electrodes are mixed into the coating material.

SUMMARY OF THE INVENTION

The present invention has been developed to obviate the disadvantages of the prior art and has as its object the provision of an electrodeposition coating system capable of effectively preventing the heavy metal, etc. from being mixed into the coating material in the bath and capable of controlling the acid removing rate.

To achieve the above-described object, according to the present invention, in an electrodeposition coating system comprising a first electrode provided in an electrodeposition bath and at least one second electrode provided in association with the first electrode, wherein current is passed through an aqueous solution of a substance for forming a coating film, which is contained in the electrodeposition bath to electrodeposit the substance for forming a coating film onto the first electrode, the aqueous solution and the second electrode are separated from each other by a membrane portion having a first function of precluding most of the flow of ionized neutralizing agent in the aqueous solution attracted to the second electrode and a second function of precluding the flow of ions flowing out of the side of the second electrode attracted by the first electrode.

Furthermore, according to the present invention, to achieve the above-described object utilizing a further arrangement of that, in the electrodeposition coating system comprising the first electrode provided in the electrodeposition bath and the second electrodes including a plurality of electrodes provided in association with the first electrode, wherein current is passed between the first electrode and the second electrodes through the aqueous solution of the substance for forming a coating film, which is contained in the electrodeposition bath, to electrodeposit the substance for forming a coating film onto the first electrode, some of the second electrodes are each provided with a first membrane portion having a first function of precluding most of the flow of ionized neutralizing agent in the aqueous solution attracted by the second electrodes and a second function of precluding the flows of ions flowing out of the side of the second electrodes attracted by the first electrode, and the remaining electrodes of the second electrodes are each provided with a second membrane portion having a function of osmotically extracting the neutralizing agent.

DETAILED DESCRIPTION OF THE PREFERRED EMBODIMENTS

The first embodiment of the present invention will hereunder be described with reference to FIGS. 1 to 5.

First Embodiment

This embodiment shows a case where the electrodeposition coating system of the invention is used for the cation electrodeposition coating using an aqueous solution W obtained by neutralizing the coating material of cation type with acetic acid, as the aqueous solution of the substance for forming a coating film.

Figure 1:
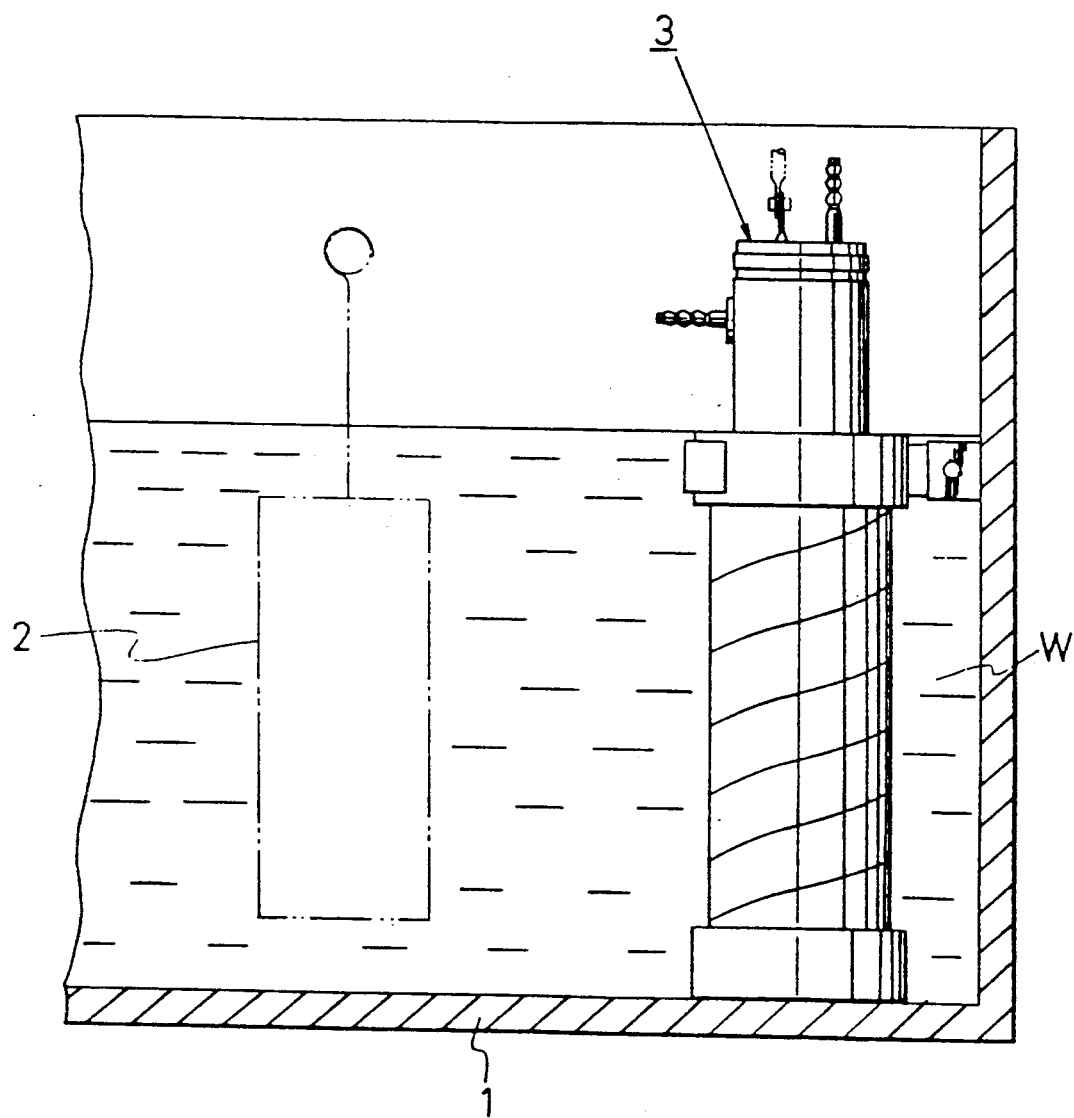
FIG. 1 is an explanatory view, partially omitted, showing a first embodiment of the invention.

Referring to FIG. 1, an article 2 to be coated as being the first electrode is provided in the electrodeposition bath. At the side wall portion in the electrodeposition bath, the membrane electrode devices 3 are provided in association with the article 2, respectively. In actuality, a plurality of these membrane electrode devices 3, not shown here, are provided.

Figure 2:
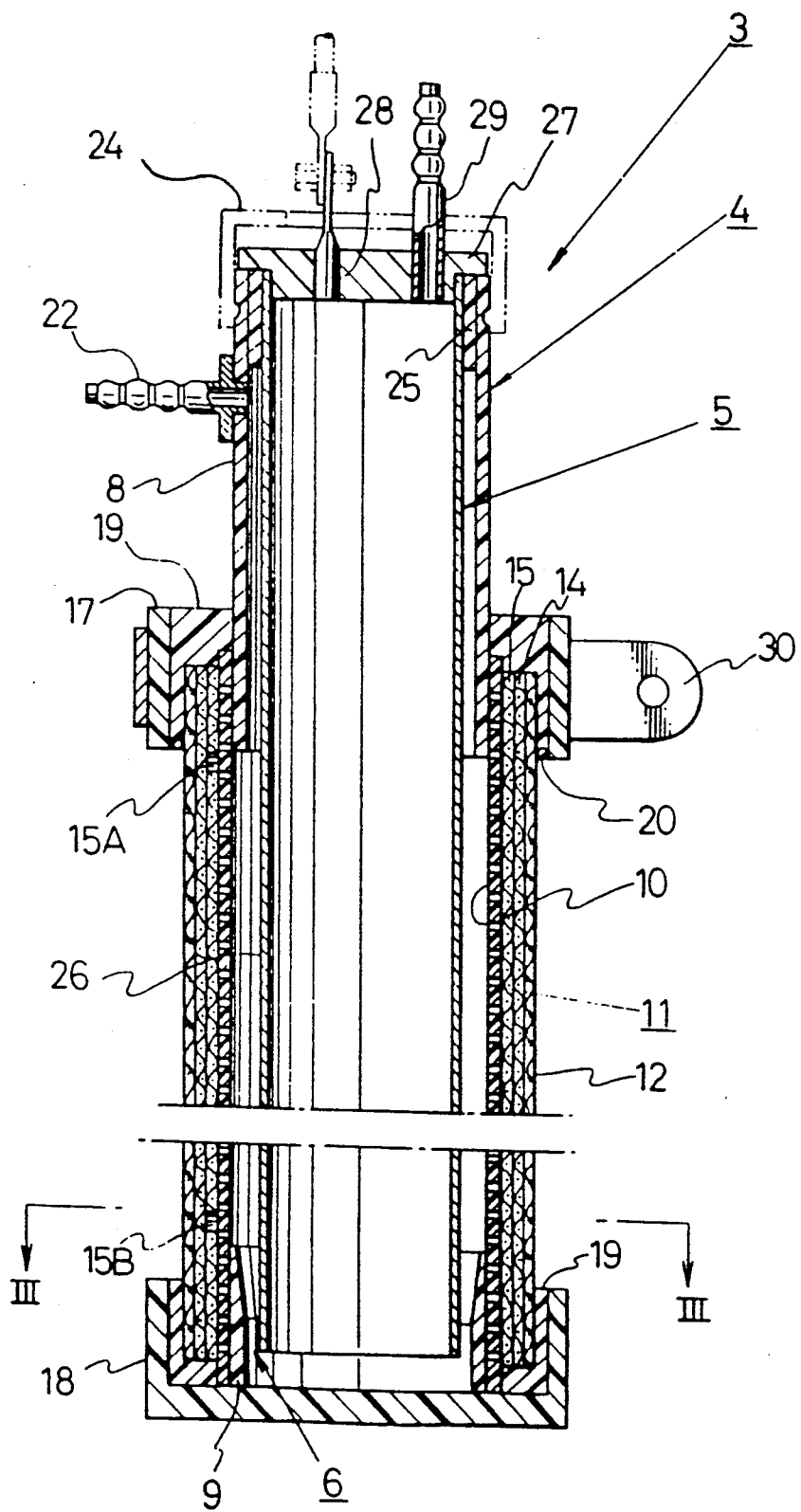
FIG. 2 is a sectional view showing the detailed construction of the membrane electrode device used in the above embodiment.

As shown in FIG. 2, this membrane electrode device 3 includes a body portion 4, an electrode portion 5 as being a second electrode and a water passing mechanism 6 comprising a gap or the like interposed therebetween.

The body portion 4 is constituted by a first and a second insulating tubes 8 and 9, which are provided at a given interval on the same axis, a relatively rigid membrane support member 10 for connecting the insulating tubes 8 and 9 to each other, a membrane portion 11 wound around the outer periphery of this membrane support member 10, and an outer cloth 12 further wound around the outer periphery of this membrane portion 11. As this outer cloth 12, one made of chemical fibers or the like for example, having satisfactory durability to a tensile force, and being waterpermeable is used.

The membrane support member 10 is of a non-conductive mesh-like member or a water-passing porous member and formed into a relatively long tubular form, and connected to the first and second insulating tubes 8 and 9 at the inner diametrical sides of the opposite end portions thereof.

Figure 3:
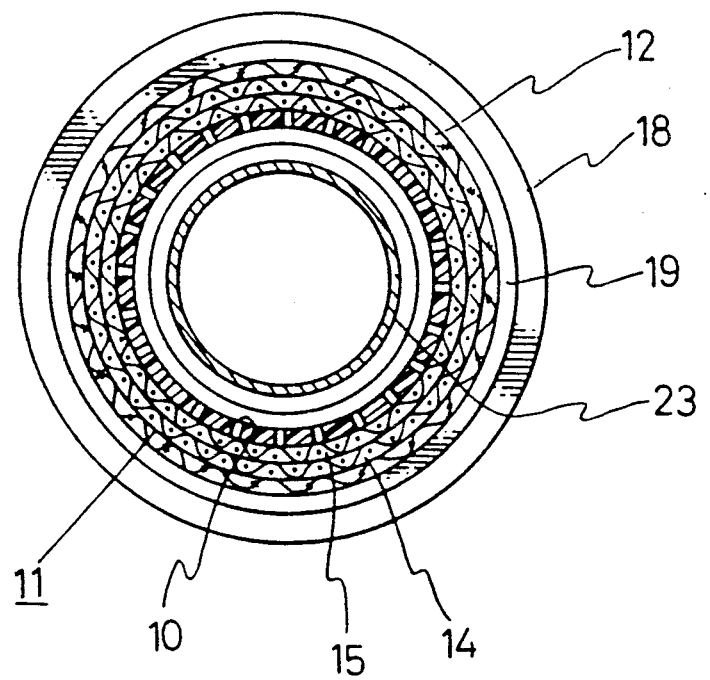
FIG. 3 is a sectional view taken along the line III—III in FIG. 2.

As shown in FIGS. 2 and 3, the membrane portion 11 is formed into a cylindrical form and is constituted by a double-wall ion exchange membrane including a cation exchange film 14 provided at the outside (on the side of the aqueous solution W) and an anion exchange film 15 provided at the side of the electrode portion 5 on the inner side as opposed to the cation exchange film 14.

More specifically, as described hereunder, the cation exchange film 14 on the outside and the anion exchange film 15 on the inner side are wound around the outer periphery of the membrane support member 10 in a state where opposite ends of the both films are integrally fixed to each other. In actuality, the surfaces of the cation exchange film 14 and the anion exchange film 15 are provided with slight irregularities, whereby certain gaps are formed at the opposed portions of the both films. For this, as shown in FIG. 2, small holes 15A and 15B are provided at the upper and lower ends of the anion exchange film 15 on the inner side. A polar liquid constantly fills the gaps formed between the cation exchange film 14 and the anion exchange film 15 through the aforesaid small holes, whereby the gaps impairing the current passage can be prevented from occurring.

Here, the reason why the cation exchange film 14 and the anion exchange film 15 are provided in a double-wall construction to form the membrane portion 11 is that the flow of minus ions in the acid as being the neutralizing agent in the aqueous solution W is precluded by the cation exchange film 14 on the side of the aqueous solution W, and the flow of the plus heavy metal ions melted out of a tubular electrode 26 to be described hereunder is precluded by the anion exchange film 15. Namely, the acid transmittance of the cation exchange film is $1 \times 10^{-6}$ (mol/Coulomb) or therebelow and expected to be very low as compared with the case of use of the anion exchange film of $8-10 \times 10^{-6}$ (mol/Coulomb). Furthermore, the value of transmission of the heavy metal is $4-15 \times 10^{-6}$ (g/Coulomb) at the time of using the cation exchange films under the normal operating conditions of the electrodeposition coating line. In contrast thereto, in the case of the anion exchange films, the value is as low as $0.025 \times 10^{-6}$ (g/Coulomb).

Here, it is generally considered that the current does not flow when the acid, i.e. the minus ions are precluded by the cation exchange film 14 and the plus ions are precluded by the anion exchange film 15. However, for the following reason, the current satisfactorily flows in actuality.

Figure 4:
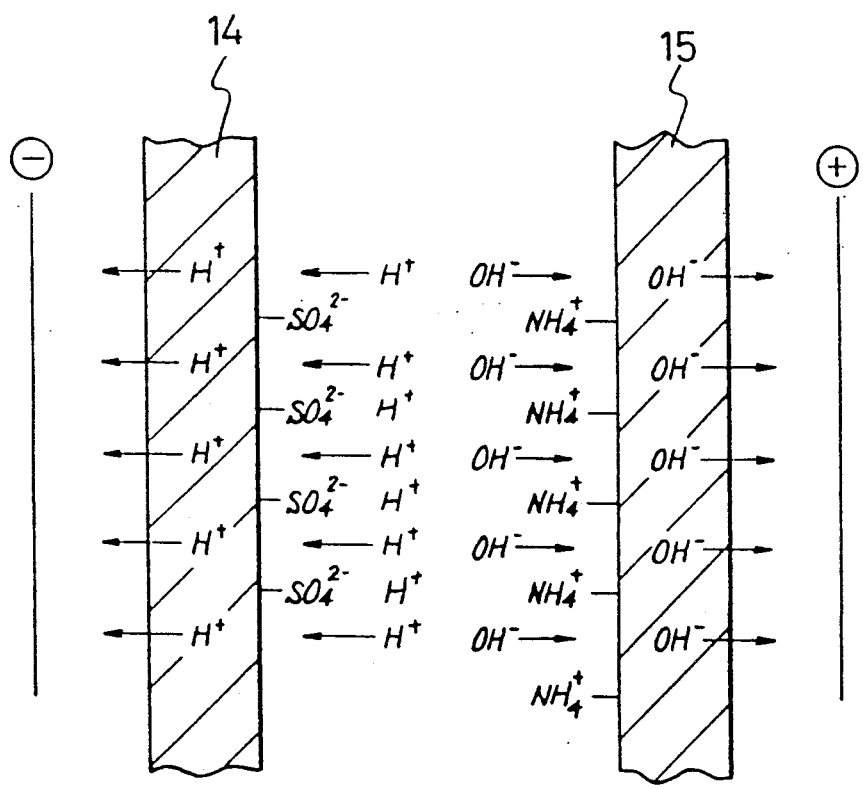
FIG. 4 is an explanatory view showing the principle that current is passed between the cation exchange film and the anion exchange film in the above embodiment.
Figure 5:
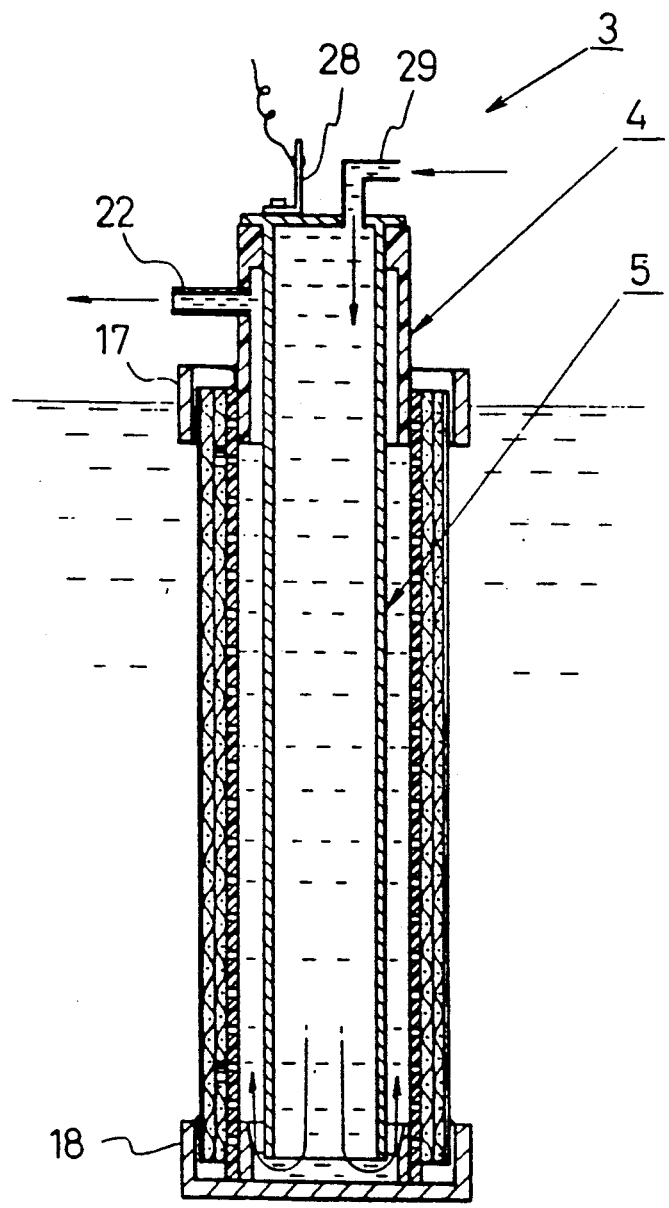
FIG. 5 is an explanatory view showing the actual use conditions of the membrane electrode device in the above embodiment.

As shown in FIG. 4, a portion of water existing at border surfaces between the cation exchange film 14 and the anion exchange film 15 is ionized into [H+] and [OH−]. In the case of neutralized pure water, the degrees of ionization of both the [H+] and [OH−] are set at about $10^{-7}$ (mol/liter). However, in an interface between the anion exchange film 15 and the cation exchange film 14, the degrees of ionization are biased. Namely, the concentration of [OH−] is high on the surface of the anion exchange film 15 due to the existence of anion exchange groups of [−NH$_4$+] etc. On the contrary, the concentration of [H+] is high on the surface of the cation exchange film 14 due to the existence of cation exchange groups [−SO$_4$$^{2-}$], etc.

Both of these [OH−] and [H+] are very high in the mobility, whereby the electric charge is caused to move.

The membrane portion 11 is wound around the membrane support member 10, so that the membrane portion 11 is considerably reinforced in the mechanical strength against the external pressure. Further, the outer cloth 12 is spirally wound around the outer peripheral surface of this membrane portion 11 as described above, whereby the membrane portion 11 is given a satisfactory strength against the internal pressure.

As shown in FIG. 2, a first and a second frame bodies 17 and 18 are provided at a given interval on the outer peripheries of the opposite end portions of the membrane support member 10 wound therearound with the membrane portion 11 and the outer cloth 12 and, at the same time, the inner diametrical sides of these frame bodies 17 and 18 are filled up with potting material 19, so that the insulating tubes 8, 9, the membrane support member 10, the membrane portion 11 and the outer cloth 12 are simultaneously and firmly integrated with one another. In this case, the first frame body 17 is formed into a tubular form, and, in filling the potting material 19, in order to prevent the potting material 19 before being solidified from flowing out, a ring member 20 is provided in the first frame body 17. The second frame body 18 is formed into a bottomed tubular form, the potting material 19 is filled in a state where the membrane support member 10, the insulating tube 9 and the like are inserted into the second frame body 18 as described above, and all of the above members are simultaneously and integrally fixed to one another.

In this embodiment, as the potting material 19, epoxy resin is used, however, urethane resin, phenol resin or the like may be used as well.

In this embodiment, as the first and second insulating tubes 8 and 9, rigid tubes of vinyl chloride resin are used. Out of these tubes, as shown in FIG. 2, the first insulating tube 8 is provided with a water discharge portion 22 and detachably provided at the top end portion thereof with a cap 24. Designated at 25 is a spacer secured to the inner diametrical side of the top end portion of the insulating tube 8.

On the other hand, the electrode portion 5 is constituted by a tubular electrode 26 made of stainless steel, a metallic lid member 27 provided at the top end portion thereof shown in FIG. 2, for suspendingly engaging the electrode, a connecting terminal 28 for a power source and a water feed portion 29. Out of these, the outer diameter of the tubular electrode 26 is further smaller than the inner diameter of each of the insulating tubes 8 and 9 of the body portion 4. For this, mounting to the body portion 4 of the tubular electrode 26 and demounting therefrom are easily performed, and a portion of the water passing mechanism 6 is formed between the body portion 4 and the tubular electrode 26. The end edge of the outer periphery of the metallic lid member 27 is raised from the tubular electrode 26, whereby the tubular electrode 26 is engaged with the first insulating tube 8 as shown in FIG. 2. For this, the electrode portion 5 can be very easily inserted into the body portion 4 from the outside, and can be very easily detached to the outside as necessary.

The water passing mechanism 6 is to be used for discharging acetic acid and the like accumulated between the membrane portion 11 and the tubular electrode 26 to the outside, and specifically, is constituted by the above-described electrode portion 5 and the body portion 4. More specifically, water which is caused to flow through the water feed portion 29 of the electrode portion 5 flows down through the tubular electrode 26 as indicated by an arrow in FIG. 5, flows to the outer periphery of the tubular electrode 26 from the bottom thereof, while rising along the outer periphery of the tubular electrode 26, flows at the inner side of the membrane portion 11, and is forced to flow together with the impurities to the outside through the discharge portion 22.

Wound around a portion of the frame body 17 at one end of the frame body 4 is a fixture 30 for mounting the frame body 17 to the bath for the electrodeposition coating. The outer cloth 12 wound around the outer surface of the membrane portion 11 need not necessarily be limited to the cloth-like one, and the outer cloth may be replaced by any other member only if the member is identical in the reinforcing function and the water permeability with the outer cloth. Further, the membrane portion 11 may be one which is wound spirally on the premise that the joint portion is made waterproof.

A method of fixing the membrane portion 11 constituting the main portion of the above-described body portion 4 will hereunder be described in further detail.

Firstly, the anion exchange film 15 constituting the membrane portion 11 is wound around the outer periphery of the membrane support member 10, and opposite end edges of the anion exchange film 15 are abutted against each other, whereby the anion exchange film 15 is secured in a generally circular shape in section as shown in FIG. 3. The cation exchange film 14 is wound around on the anion exchange film 15, and opposite end edges of the cation exchange film 14 are overlapped or abutted against each other, whereby the cation exchange film 14 is secured in a generally circular shape in section as shown in FIG. 3. Subsequently, the outer cloth 12 is spirally wound around the outer surface of this cation exchange film 14, whereby integration of the membrane support member 10 and the membrane portion 11 is completed. Subsequently, the first and second insulating tubes 8 and 9 are coupled to opposite end portions of the tubular membrane portion formed as described above as shown in FIG. 2, and simultaneously, the first and the second frame bodies 17 and 18 are provided at an interval on the outside of the respective coupled portions as aforesaid. The potting material 19 is filled in the frame bodies 17 and 18, and solidified therein, whereby the body portion 4 is completely integrated.

Incidentally, the ring member 20 provided at the inner side of the bottom end of the first frame body 17 in FIG. 2 is intended for preventing the potting member 19 before being solidified from flowing out as aforesaid, and therefore, the ring member 20 may be removed after the potting material 19 is solidified.

The action of this embodiment as a whole will be described. When the article 2 and the membrane electrode device 3 are provided in the aqueous solution W, the article 2 is turned into a negative pole and the tubular electrode 26 of the membrane electrode device 3 is turned into a positive pole, and a DC voltage is applied to the poles, the electrodeposition coating is started as usual, whereby components of coating material resin and colloidal molecules of the pigment, which have the positive charge, move in the aqueous solution towards the article 2 as being the negative pole, are attached to the surfaces of the article 2 and discharged, and thereafter, a solid substance of the coating material agglomerates to form a coating film.

On the other hand, acetic acid having negative charge is accumulated in the aqueous solution W. Simultaneously with the aforesaid start of the electrodeposition coating, this acetic acid starts to move towards the tubular electrode 26 of the membrane electrode device 3. Here, in this embodiment, since the cation exchange film 14 is on the side of the aqueous solution W, most of the flow of acetic acid as being the neutralizing agent in the aqueous solution W is precluded by this cation exchange film 14, and cannot reach the side of the tubular electrode 26, whereby the acetic acid is accumulated in the aqueous solution W. However, since this cation exchange film 14 does not completely preclude the acetic acid, a portion of the acetic acid reaches the tubular electrode 26 and is discharged. In this case, since the acetic acid as being the discharged neutralizing agent is low in concentration (in this embodiment, several %), almost of all of the value of the acetic acid is ionized. For this reason, the acetic acid having the negative charge is attracted towards the tubular electrode 26 as being the positive pole during current passage, whereby the acetic acid is accumulated between this tubular electrode 26 and the membrane portion 11. On the other hand, since the pure water is forced to flow between this tubular electrode 26 and the membrane portion 11 as aforesaid, the accumulated acetic acid is continuously discharged together with the pure water to the outside. On the other hand, the flow-out of the heavy metal ions melted out of the tubular electrode 26 due to the action of the anion exchange film 15 to the side of the aqueous solution W is effectively precluded.

After actually measuring the acid removing rate and the heavy metal transmittance, the inventor obtained the following results.

(1) The acid removing rate $1.3 \times 10^{-6}$ (mol/Coulomb)

(2) The heavy metal transmittance $0.058 \times 10^{-6}$ (g/Coulomb)

(These values were obtained such that, although these values were somewhat inferior to the individual characteristic values of the above-described respective membrane films, in the cation exchange film 14, the plus ions moving from the polar liquid were precluded by the anion exchange film 15, the electric charge and the carrier, which passed through the cation exchange film 14 lacked, and accordingly, such a tendency was shown that the electric charge was carried by the passage of the minus ions (acid). Further, in the anion exchange film 15, the acid was precluded by the cation exchange film 14 provided on the side of the coating material and the carrier of the minus ions lacked, and accordingly, such a tendency was shown that the electric charge was carried by the passage of the plus ions.)

However, the membrane portion 11 was turned into a double-wall construction constituted by the cation exchange film 14 and the anion exchange film 15, so that it was possible that the acid removing rate was reduced to about 1/7 of that at the time of solely using the anion exchange film in the prior art and that the transmission of the heavy metal was suppressed to $0.058 \times 10^{-6}$ (g/Coulomb) which is about 1/70 of that at the time of solely using the cation exchange film in the prior art.

As described above, according to this embodiment, the second electrode provided in association with the article 2 as being the first electrode is turned into the tubular electrode 26, the membrane portion 11 is laminatedly provided around this tubular electrode 26 through the membrane support member 10 formed of an insulating material, this membrane portion 11 has a double-wall construction constituted by the anion exchange film 15 provided on the side of the tubular electrode 26 and the cation exchange film 14 provided at the outer side of the anion exchange film 15, the flow of the minus ions attracted by the tubular electrode 26 in the neutralizing agent in the aqueous solution W is precluded by the cation exchange film 14, and the flow of the plus ions attracted by the article 2 and melted out of the side of the tubular electrode 26 are precluded by the anion exchange film 15, so that such advantages can be achieved that the acid removing rate is considerably lowered as compared with the case where solely the anion exchange film is used in the prior art, the flow-out of the heavy metal ions from the side of the tubular electrode 26 towards the coating material is effectively precluded, and moreover, the sludge of the coating material is not generated because the tubular electrode 26 is not bare. Further, fluctuations in the external pressure can be satisfactorily borne through the agency of the membrane support member 10, so that the system can be continuously used for a long period of time. The system is constructed such that water is forced to flow from below to above through the portion of the membrane support member 10, so that polarized particles and bubbles, which stagnate around the tubular electrode 26, can be forcibly removed. The water-permeable outer cloth 12 is wound around the outer surface of the membrane portion 11, so that, advantageously, the membrane portion 11 can satisfactorily bear the fluctuations in the internal pressure even if the tensile strength of the membrane portion 11 is extremely weak.

For this, when a plurality of membrane electrode devices 3 thus constructed and thus functioning and the membrane electrode device equipped with the conventional anion exchange film are provided and used in the aqueous solution W, excessive removal of the acid as being the neutralizing agent, which has been problematical, can be avoided and the heavy metal ions melted out of the electrode can be substantially completely prevented from mixing into the components of the coating material (ED both coating material) in the aqueous solution W.

The embodiments of the present invention other than the first embodiment will hereunder be described.

Incidentally, in the description of the following respective embodiments, same reference numeral are used to designate same or similar components or parts corresponding to ones as shown in the first embodiment, so that the description will be omitted or simplified.

The second embodiment

Figure 6:
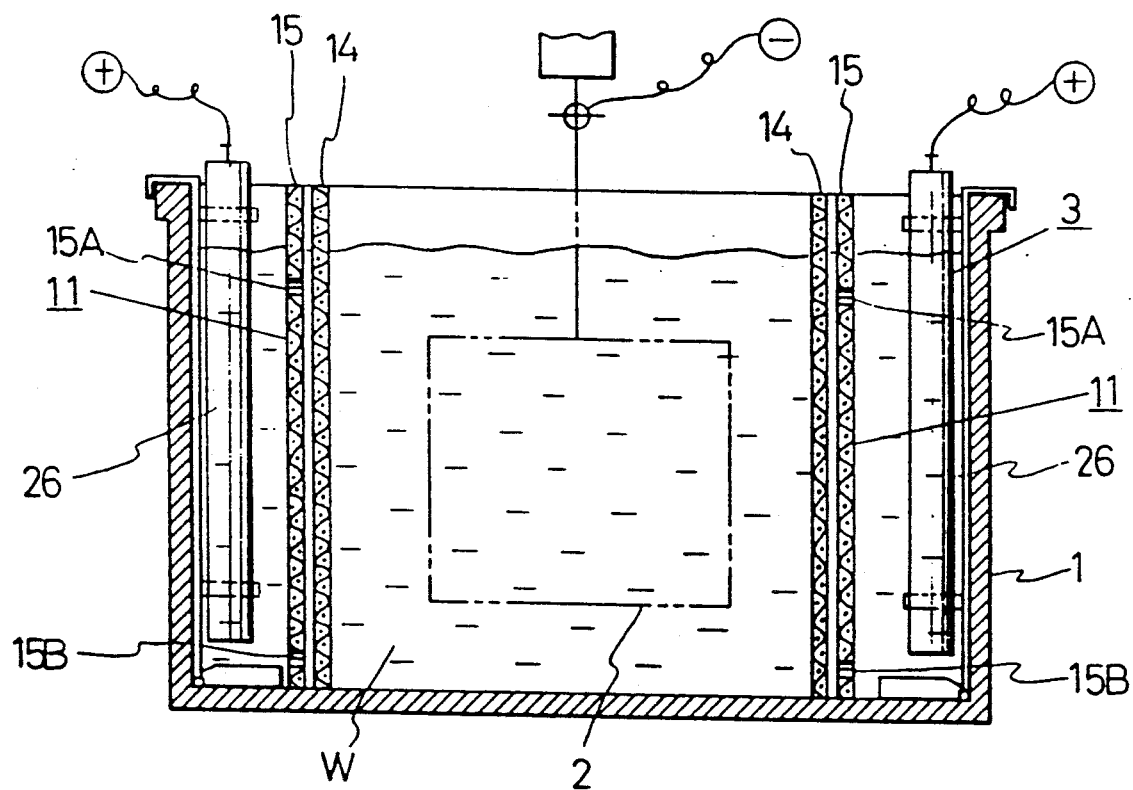
FIG. 6 is a general arrangement diagram explaining a second embodiment of the invention.

FIG. 6 shows the second embodiment of the invention. This second embodiment features that the cation exchange film 14 and the anion exchange film 15 are provided in the vicinity of the side wall of an electrode-position bath 1 and the tubular electrode 26 is immersed in a polar liquid between the exchange films 14, 15 and the side wall of the electrodeposition bath 1. In this case, the cation exchange film 14 and the anion exchange film 15, being weak in their strengths, are actually provided together with the membrane support member formed of a non-conductive mesh-like member or a water-permeable porous member, both of which are not shown. Incidentally, in the second embodiment, the water-passing mechanism is provided under the same principle as in the first embodiment, through it is not shown in FIG. 6.

Action and effects in the second embodiment are substantially similar to those of the first embodiment. However, the second embodiment is advantageous in that the maintenance and inspection of the membrane portion 11 and the tubular electrode 26 can be conducted easily.

The third embodiment

Figure 7:
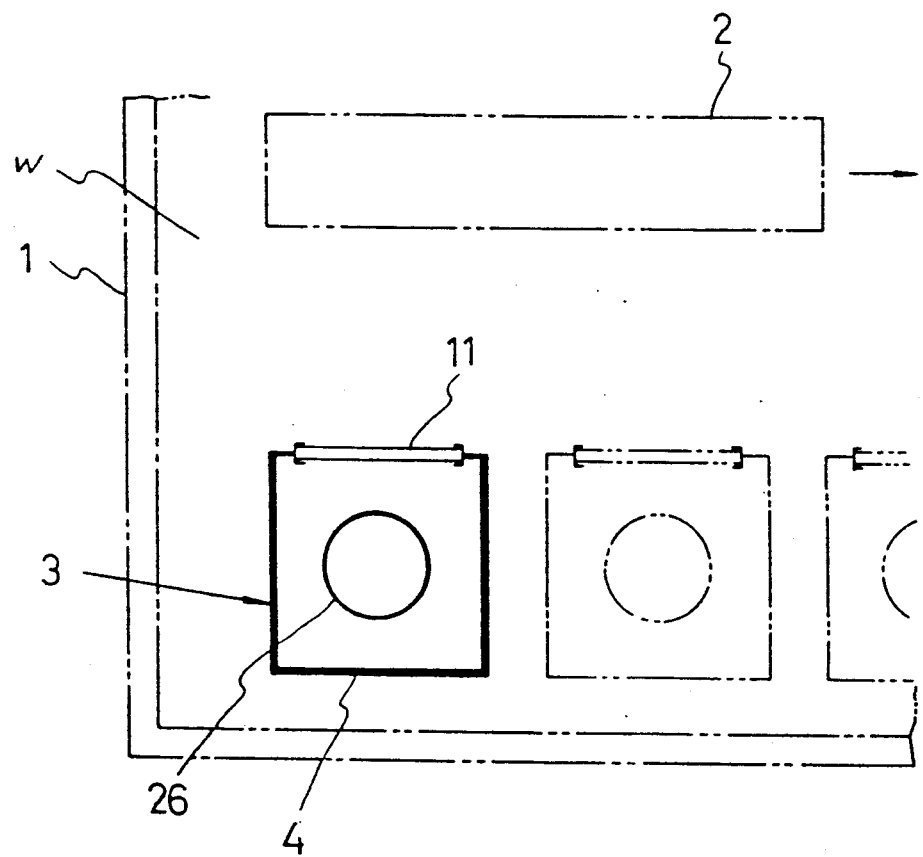
FIG. 7 is an explanatory view showing a third embodiment.

FIG. 7 shows the third embodiment. In this embodiment, the body portion 4 in the first embodiment is formed into a generally U-shape in cross-section and the membrane portion 11 is supported by an opening portion of this body portion 4.

Even with this third embodiment as described above, the same action and effects can be achieved as in the preceding embodiments, and further, such an advantage can be attained that the work of exchanging the membrane portion 11 can be further facilitated.

The fourth embodiment

Figure 8A:
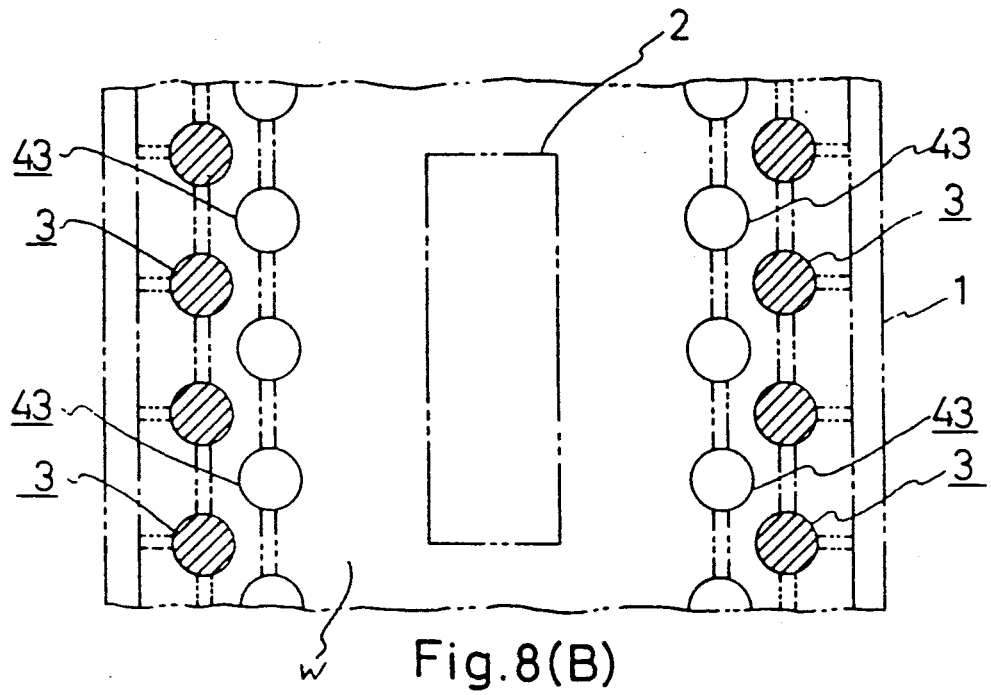
FIGS. 8(A) and 8(B) are a plan view and a side view explaining a fourth embodiment.
Figure 8B:
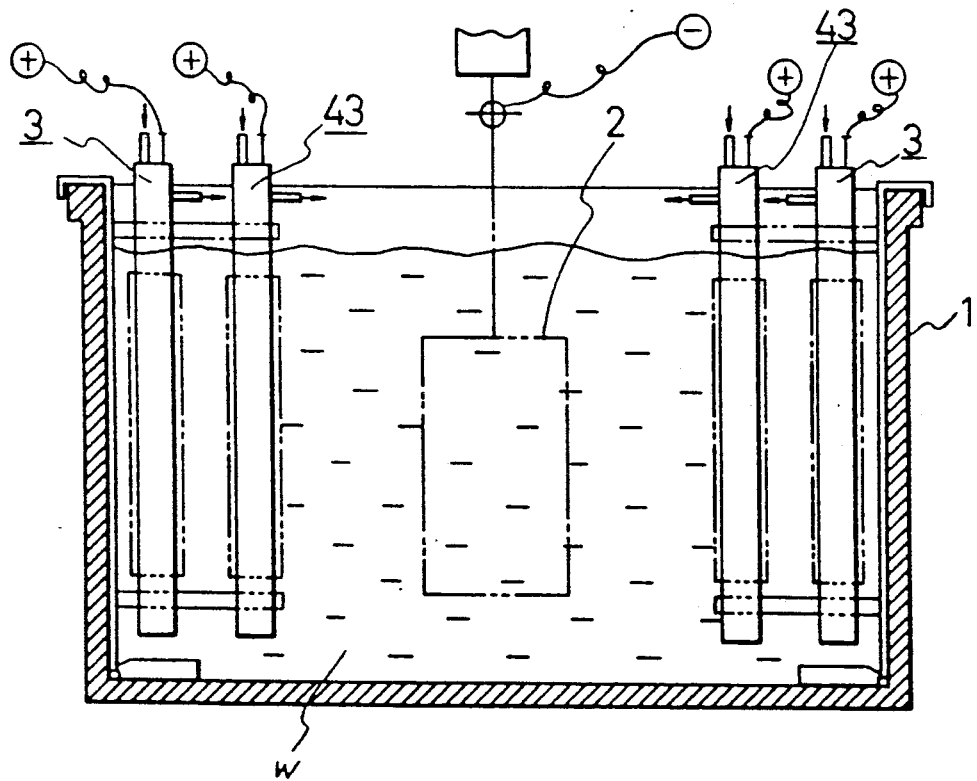

FIG. 8 shows the fourth embodiment. This embodiment features that the membrane electrode device 3 are combinedly used with membrane electrode devices 43 different in type from the membrane electrode devices 3.

The membrane electrode device 3 is common with the one used in the first embodiment, and the membrane electrode device 43 has a construction wherein solely the normal anion exchange film is provided. Other respects of construction and action thereof are substantially similar to those in the preceding embodiments.

The forth embodiment as described above combinedly uses the membrane electrode device 3 capable of suppressing the acid removing rate and preventing the flow-out of the heavy metal ions melted out of the electrode and the membrane electrode device 43 having the anion exchange film capable of effectively extracting the acid, so that, by combining these electrode devices properly, the acid removing rate can be advantageously set at a desirable value.

The fifth embodiment

Figure 9:
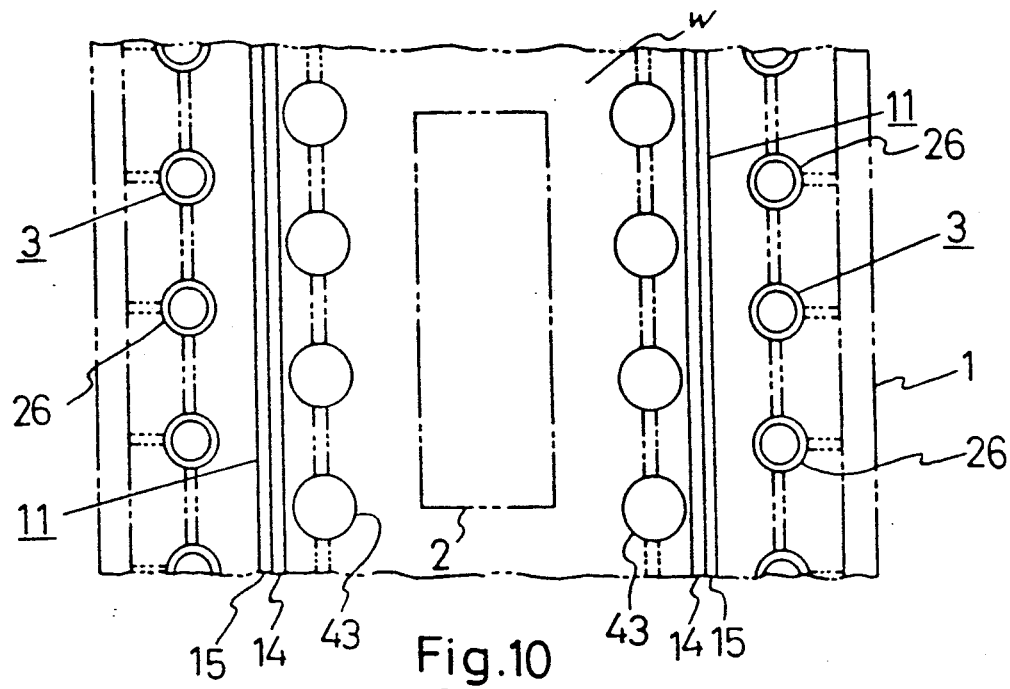
FIG. 9 is a plan view showing a fifth embodiment.

FIG. 9 shows the fifth embodiment. This embodiment features that the construction of the second embodiment (Refer to FIG. 6) is adopted as the basic construction and the membrane electrode device 43 wound around solely by the anion exchange film as in the fourth embodiment is interposed between the membrane portion 11 and the article 2. Even with this arrangement, the action and effects similar to those in the preceding embodiments can be attained.

The sixth embodiment

Figure 10:
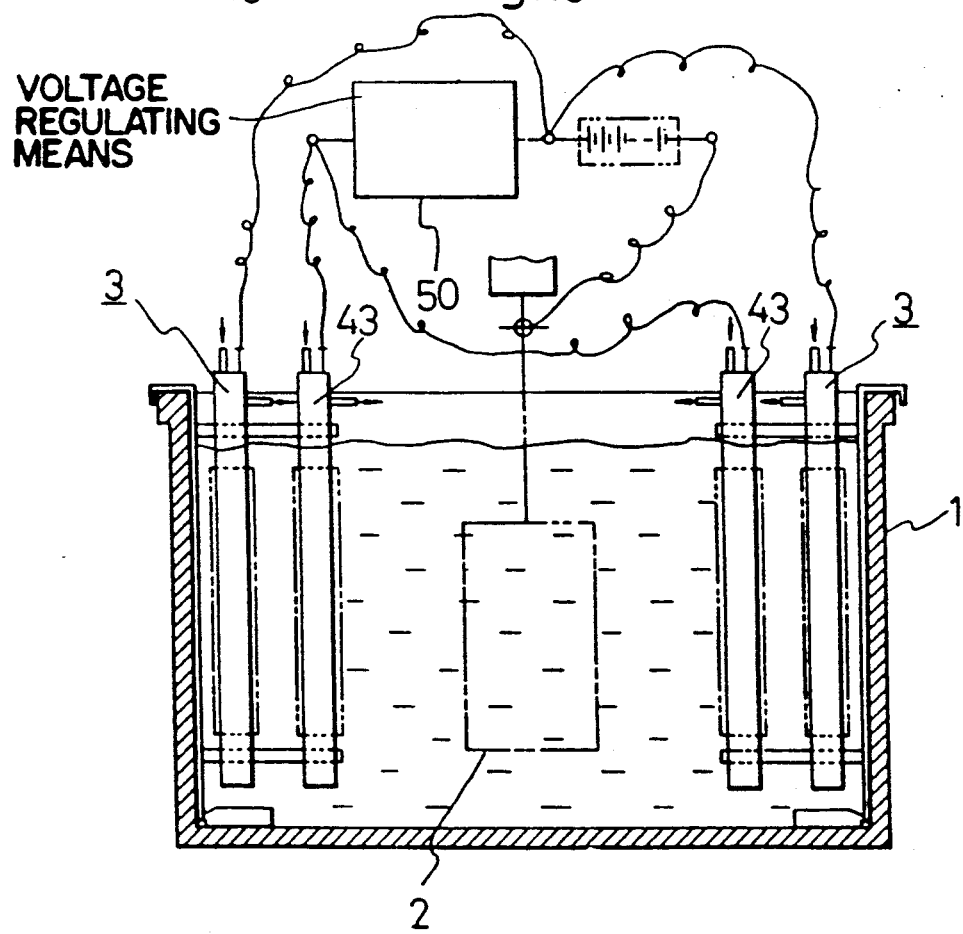
FIG. 10 is a side view showing a sixth embodiment.

The sixth embodiment will hereunder be described with reference to FIG. 10.

This embodiment features that there is provided a voltage regulating means 50 for regulating the voltage applied between the membrane electrode devices 3, 43 and the article 2 as in the fourth embodiment. Other respects of construction are similar to those in the fourth embodiment as described above.

Even with this arrangement, the action and effects similar to those in the preceding embodiments can be attained, and moreover, the voltage applied between the respective membrane electrode devices and the article 2 can be regulated through the agency of the voltage regulating means 50, so that adjustment of the value of acid in the electrodeposition bath 1 can be advantageously facilitated more easily.

Figure 11:
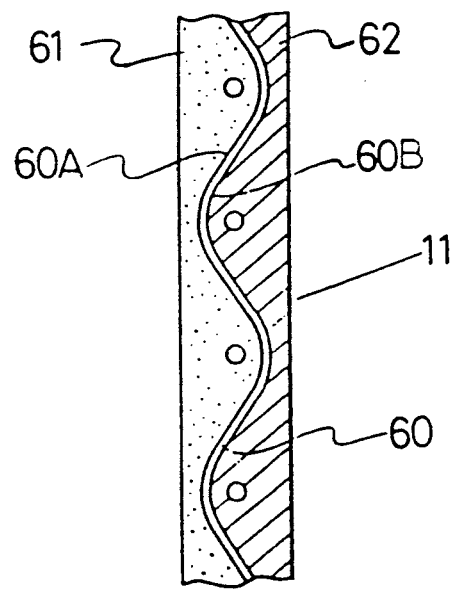
FIGS. 11 and 12 are sectional views showing examples of modification of the membrane portions in the respective above embodiments.
Figure 12:
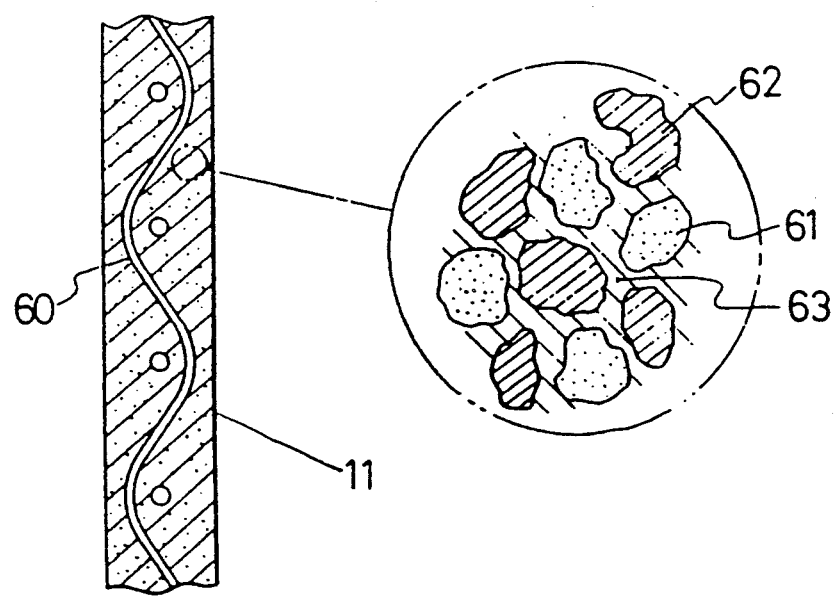

Incidentally, in the description of the preceding embodiment, such an example has been shown that the membrane portion 11 has the double-wall construction constituted by the anion exchange film 14 and the cation exchange film 15, however, this construction should not necessarily be limited to the preceding embodiment and may be arranged as in FIGS. 11 and 12.

Namely, as shown in FIG. 11, a composite exchange film may be adopted in which a base film 60 formed of a woven cloth made of nylon or polyethylene is coated at one side surface 60A thereof with cation exchange resin 61 and at the other side surface 60B thereof with anion exchange resin 62. Or, as shown in FIG. 12, a mixture, in which powders of the anion exchange resin 62 and of the cation exchange resin 61 are mixed in a ratio of 50:50 and bound together with a binder 63, is coated on the opposite side surfaces of the base film 60 formed of the woven cloth made of nylon or polyethylene, to thereby form a composite exchange film.

From the microscopic viewpoint, this is regarded as that, the mixture of the exchange resins of the both types has the effects similar to the membrane film system laminated in a manner of cation resin/anion resin/-cation resin/anion resin/......

Incidentally, even between the mixing ratios 10:90 and 90:10, it was ascertained that the mixing ratios have the practicable effects in view of the acid removing ratio. The above-described membrane portion 11 offers the advantages that such an effect that assembling of the membrane portion 11 can be performed easily and quickly is added and, only by changing the mixing ratio, the acid removing rate can be set at various values.

The present invention is thus constructed and thus functioning, whereby the second electrode provided in association with the article, which is the first electrode, is separated from the aqueous solution by the membrane portion having the first function of precluding most of the flow of the ions attracted by the second electrode in the neutralizing agent in the aqueous solution of the substance for forming the coating film and the second function of precluding the flow of the ions attracted by the first electrode and flowing out of the second electrode, so that when this is used in the cation electrodeposition coating as in the above embodiment for example, the acid removing rate can be considerably lowered as compared with the conventional electrodeposition coating method using the anion exchange film, and the unprecedented outstanding electrodeposition coating system can be provided, which is capable of effectively precluding the flow-out of the heavy metal ions from the side of the electrode to the side of the coating material.

When the membrane electrode device provided with solely the anion exchange film is combinedly used with the second electrode, the acid removing rate can be adjusted in accordance with the condition of the electrodeposition coating.

What is claimed is:

1. An electrodeposition coating system comprising a first electrode provided in an electrodeposition bath and at least one second electrode provided in association with said first electrode, wherein current is passed through an aqueous solution of a substance contained in said electrodeposition bath to electrodeposit said substance for forming a coating film onto said first electrode, said aqueous solution and said second electrode or electrodes being separated from each other by a membrane portion having a first function of precluding most of the flow of ionized neutralizing agent in said aqueous solution from being attracted to said second electrode or electrodes and a second function of precluding the flow of ions which are away from said second electrode and which are attracted by said first electrode.

2. The electrodeposition coating system as set forth in claim 1, wherein said membrane portion comprises a cation exchange film and an anion exchange film opposed to said cation exchange film.

3. The electrodeposition coating system as set forth in claim 1, wherein said aqueous solution is obtained by neutralizing a coating material of cation type by an acid, and further wherein said membrane portion comprises a cation exchange film provided on the side of the first electrode and an anion exchange film provided on the side of the second electrode or electrodes.

4. The electrodeposition coating system as set forth in claim 1, wherein said membrane portion includes a base film which is coated at one surface with a cation exchange resin and at the other surface with an anion exchange resin.

5. The electrodeposition coating system as set forth in claim 1, wherein said membrane portion includes a base film which is coated with a mixture comprising a predetermined ratio of anion exchange resin and cation exchange resin.

6. The electrodeposition coating system as set forth in claim 1, wherein said second electrode or electrodes include a tubular electrode or electrodes, and each of said tubular electrodes is integrally provided therearound with said membrane portion at a given spatial interval.

7. The electrodeposition coating system as set forth in claim 1, wherein said second electrode or electrodes include a tubular electrode or electrodes and each of said tubular electrodes and said membrane portion are disposed in the electrodeposition bath separately from each other by a given spatial interval.

8. The electrodeposition coating system comprising a first electrode provided in an electrodeposition bath and a plurality of second electrodes provided in association with said first electrode, wherein current is passed between said first electrode and said second electrodes through an aqueous solution of a substance contained in said electrodeposition bath, to thereby electrodeposit said substance for forming a coating film onto said first electrode, some of said second electrodes being each provided with a first membrane portion having a first function of precluding most of the flow of ionized neutralizing agent in said aqueous solution from being attracted by said second electrodes and a second function of precluding the flow of ions which are flowing away from said second electrodes and which are attracted by said first electrodes, the remaining second electrodes being each provided with a second membrane portion for osmotically extracting said neutralizing agent.

9. The electrodeposition coating system as set forth in claim 8, wherein at least one of said second electrodes is connected to a voltage regulating means for regulating an applied voltage.

10. The electrodeposition coating system as set forth in claim 8, wherein said first membrane portion has a double-wall construction comprising a cation exchange film and an anion exchange film.

11. The electrodeposition coating system as set forth in claim 8, wherein said membrane portion includes a base film which is coated at one surface with cation exchange resin and at the other surface with an anion exchange resin.

12. The electrodeposition coating system as set forth in claim 8, wherein said membrane portion includes a base film and said membrane portion comprises a composite exchange film having a mixture coated on said base film, said mixture obtained by mixing cation exchange resin and anion exchange resin in a given ratio.

* * * * *